United States Patent [19]
Saito

[11] Patent Number: 6,128,101
[45] Date of Patent: Oct. 3, 2000

[54] E-MAIL TYPE FACSIMILE APPARATUS AND E-MAIL RECEPTION METHOD

[75] Inventor: Kyoji Saito, Kawasaki, Japan

[73] Assignee: Matsushita Graphic Communication Systems, Inc., Tokyo, Japan

[21] Appl. No.: 09/161,747

[22] Filed: Sep. 29, 1998

[30] Foreign Application Priority Data

May 15, 1998 [JP] Japan .................................. 10-133947

[51] Int. Cl.⁷ .............................. H04N 1/00; G06F 15/16
[52] U.S. Cl. ........................ 358/402; 358/1.15; 358/403; 709/206
[58] Field of Search ............................. 395/114; 358/402, 358/407, 403, 442, 462, 1.15; 709/204, 206, 217, 219, 207; 379/88.01, 88.07, 88.17, 88.13, 93.17, 93.24, 100.01, 100.08, 100.09

[56] References Cited

U.S. PATENT DOCUMENTS

| | | | |
|---|---|---|---|
| 5,333,266 | 7/1994 | Boaz et al. | 709/206 |
| 5,557,659 | 9/1996 | Hyde-Thomson | 379/88.13 |
| 5,579,472 | 11/1996 | Keyworth, II et al. | 345/326 |
| 5,647,022 | 7/1997 | Brunson | 380/49 |
| 5,754,778 | 5/1998 | Shoujima | 709/206 |
| 5,781,614 | 7/1998 | Brunson | 379/88.14 |
| 5,812,770 | 9/1998 | Sakai | 709/245 |
| 5,852,719 | 12/1998 | Fishler et al. | 709/216 |
| 5,905,866 | 5/1999 | Nakabayashi et al. | 709/223 |
| 5,956,521 | 9/1999 | Wang | 710/35 |
| 5,978,837 | 11/1999 | Foladare et al. | 709/207 |

FOREIGN PATENT DOCUMENTS

| | | |
|---|---|---|
| 62-76954 | 4/1987 | Japan . |
| 63-131750 | 6/1988 | Japan . |
| 2-108346 | 4/1990 | Japan . |
| 3270537 | 12/1991 | Japan . |
| 3276338 | 12/1991 | Japan . |
| 6290101 | 10/1994 | Japan . |
| 8-008588 | 1/1996 | Japan . |
| 8-335951 | 12/1996 | Japan . |

OTHER PUBLICATIONS

An English language abstract and Partial English Translation of JP 3–270537.
An English language abstract and Partial English Translation of JP 62–76954.
An English Language abstract and Partial English Translation of JP 3–276338.
An English Language abstract and Partial English Translation of JP 6–290101.
English Language Abstract of JP No. 8–335951.
International Search Report.
English Language Abstract of JP–8008588.
English Language Abstract of JP–6232976.
English Language Abstract of JP–2108346.
English Language Abstract of JP–63–131750.

*Primary Examiner*—Edward L. Coles
*Assistant Examiner*—Joseph R. Pokrzywa
*Attorney, Agent, or Firm*—Greenblum & Bernstein, P.L.C.

[57] ABSTRACT

The decision unit leaves unacceptable mail in the mail server and stores the left mail number and message ID of the latest mail in the 1st RAM as left mail number K and left mail ID, respectively. In the next access, the decision unit acquires the message ID of the Kth mail stored in the mail server and compares it with the left mail ID. If both match, the "K+1"th and subsequent pieces of mail are received. Therefore, it distinguishes the left mail and new incoming mail, avoiding repeated reception of the left mail. This makes it possible to leave E-mail in the mail server using it as a secondary storage device and distinguish the left E-mail and new incoming E-mail in subsequent accesses.

12 Claims, 8 Drawing Sheets

E-MAIL TYPE FACSIMILE APPARATUS AND E-MAIL RECEPTION METHOD

BACKGROUND OF THE INVENTION

1. Field of the Invention

The present invention relates to E-mail type facsimile apparatuses that receive E-mail using a mail server and E-mail reception methods.

2. Description of the Related Art

E-mail systems that are spreading recently are mainly implemented using personal computers (PC) equipped with large-capacity memories. Conventionally, E-mail is received by a mail server which stores E-mail temporarily and a PC terminal (hereafter referred to as "client PC") that transmits/receives E-mail receives the E-mail by periodically accessing the mail server. The received E-mail is stored in a secondary storage device such as a hard disk of the client PC.

On the other hand, image files and text files are attached to E-mail. There are a variety of formats and capacities of attached files. E-mail is sometimes accompanied by files that cannot be opened by the receiving side. A normal client PC receives all files attached to E-mail and stores them in a secondary storage device irrespective of whether the attached files are acceptable or not.

Recently, facsimile apparatuses (hereafter referred to as "E-mail type facsimile apparatuses") that can handle E-mail are being developed. E-mail type facsimile apparatuses in general are not provided with a secondary storage device like PC. Therefore, there is a limitation to the amount of data that can be stored in the device, and thus it is difficult to receive all files attached to E-mail and store them as with the client PC above.

Therefore, one possible way to solve this difficulty is to leave E-mail in the server. However, a conventional E-mail type facsimile apparatus cannot determine which E-mail is acceptable or not, nor can receive mail selectively by distinguishing new incoming E-mail and left E-mail in the next access.

SUMMARY OF THE INVENTION

A first objective of the present invention is to provide an E-mail type facsimile apparatus that can leave E-mail in a mail server used as a secondary storage device and distinguish E-mail that has been left and new incoming E-mail in subsequent accesses.

A second objective of the present invention is to provide an E-mail reception method that can leave E-mail in the mail server used as a secondary storage device and distinguish E-mail that has been left and new incoming E-mail in subsequent accesses.

The present invention provides an E-mail type facsimile apparatus comprising a left mail number storage unit that stores the E-mail number left in the server as left mail number K, left mail ID storage unit that stores the identification data of the latest piece of said E-mail, and mail reception unit that obtains the identification data of the Kth E-mail stored in said server, compares said identification data and said left mail ID and receives E-mail which is newer than said Kth E-mail when both of these match.

The present invention provides an E-mail reception method comprising the steps of storing the number of pieces of E-mail left in the server as left mail number K, storing the identification data of the latest piece of said E-mail as the left mail ID, obtaining the identification data of the Kth E-mail stored in said server, comparing said identification data, and said left mail ID and receiving E-mail which is newer than said Kth E-mail when both of these match.

DETAILED DESCRIPTION OF THE PREFERRED EMBODIMENTS

With reference now to FIGS. 1 to 8, the embodiment of the present invention is explained below.

Figure 1:
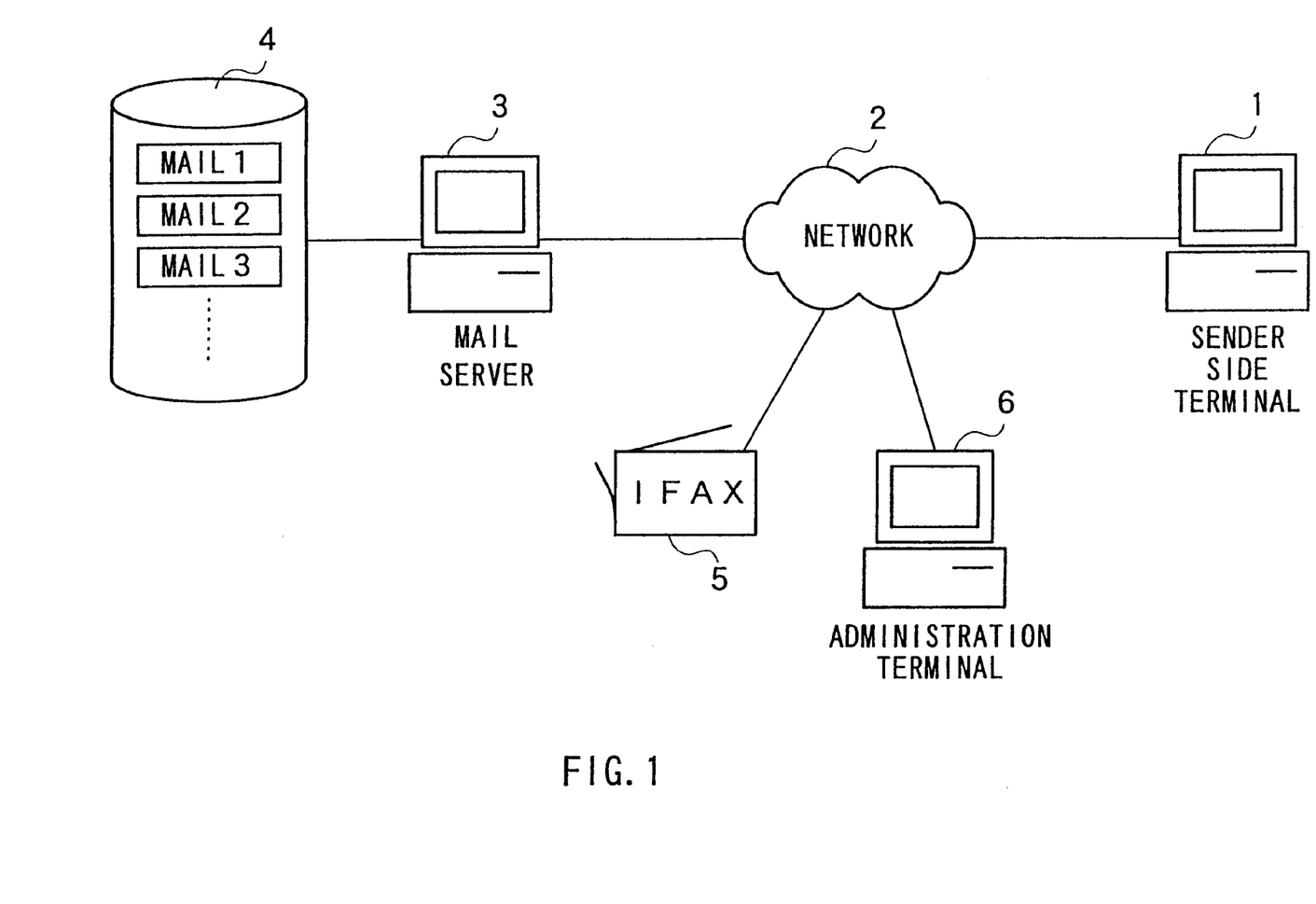
FIG. 1 illustrates a conceptual diagram of an E-mail communication system.

With reference to FIG. 1, a general case where mail is transmitted/received through a mail server is explained below. FIG. 1 is a conceptual drawing of an E-mail communication system. Mail transmitted from transmitting side terminal 1 which is a PC is stored in secondary storage device 4 of mail server 3 provided on network 2. As a receiving side terminal, E-mail type facsimile apparatus (Internet FAX: IFAX) 5 inquires of mail server 3 and performs reception operation if there is any incoming mail and receives the mail from mail server 3.

Mail server 3 consists, for example, of a POP (Post Office Protocol) server. Mail server 3 stores mail in secondary storage device 4 in order of arrival. When it receives an inquiry from the receiving side terminal, mail server 3 performs user authentication and then notifies the total incoming mail number (hereafter referred to as "total mail number"). Mail server 3 transfers mail when it receives a request from the receiving side terminal, and deletes mail when it receives a deletion request.

Figure 2:
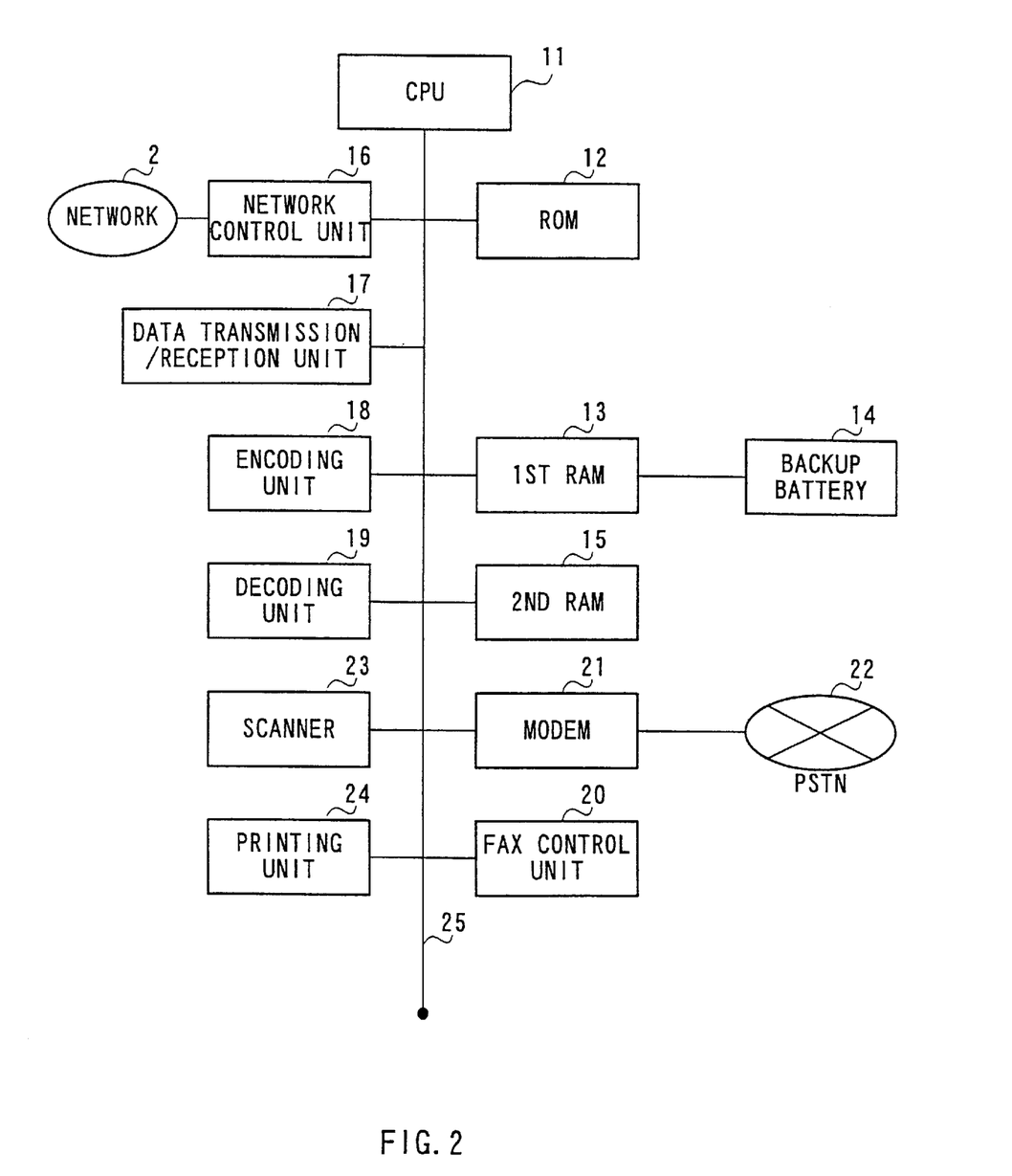
FIG. 2 illustrates a unit diagram showing an E-mail type facsimile apparatus according to an embodiment of the present invention.

FIG. 2 illustrates a unit diagram showing the E-mail type facsimile apparatus according to the embodiment of the present invention.

CPU 11 executes a program and controls the entire apparatus. ROM 12 stores the program executed by CPU 11. 1st RAM 13 is a memory that stores the number of messages and message IDs The 1st RAM 13 is connected to backup battery 14. 2nd RAM 15 is a memory that stores various data such as mail, image files, etc.

Network control unit 16 is an interface to execute the protocol necessary for transmitting/receiving mail on network 2 such as LAN (Local Area Network). Data transmission/reception unit 17 is a circuit to transmit/receive data. Communications of the present apparatus and mail server 3 are carried out according to a communication protocol such as POP3. The reception data or transmission data are stored in 2nd RAM 15 temporarily.

Encoding unit 18 converts image data of the original document output from scanner 23 which will be described later to text code for the mail. Decoding unit 19 converts text-coded image data included in the received mail to TIFF format data.

FAX control unit 20 transmits/receives data through facsimile communications. Modem 21 modulates/demodulates data when transmitting/receiving data over public switched telephone serves network (PSTN) 22.

Scanner 23 reads the original document and converts it to image data. Printing unit 24 prints the received image data, etc. Bus 25 is a signal line to transmit/receive data between each processing units.

Figure 3:
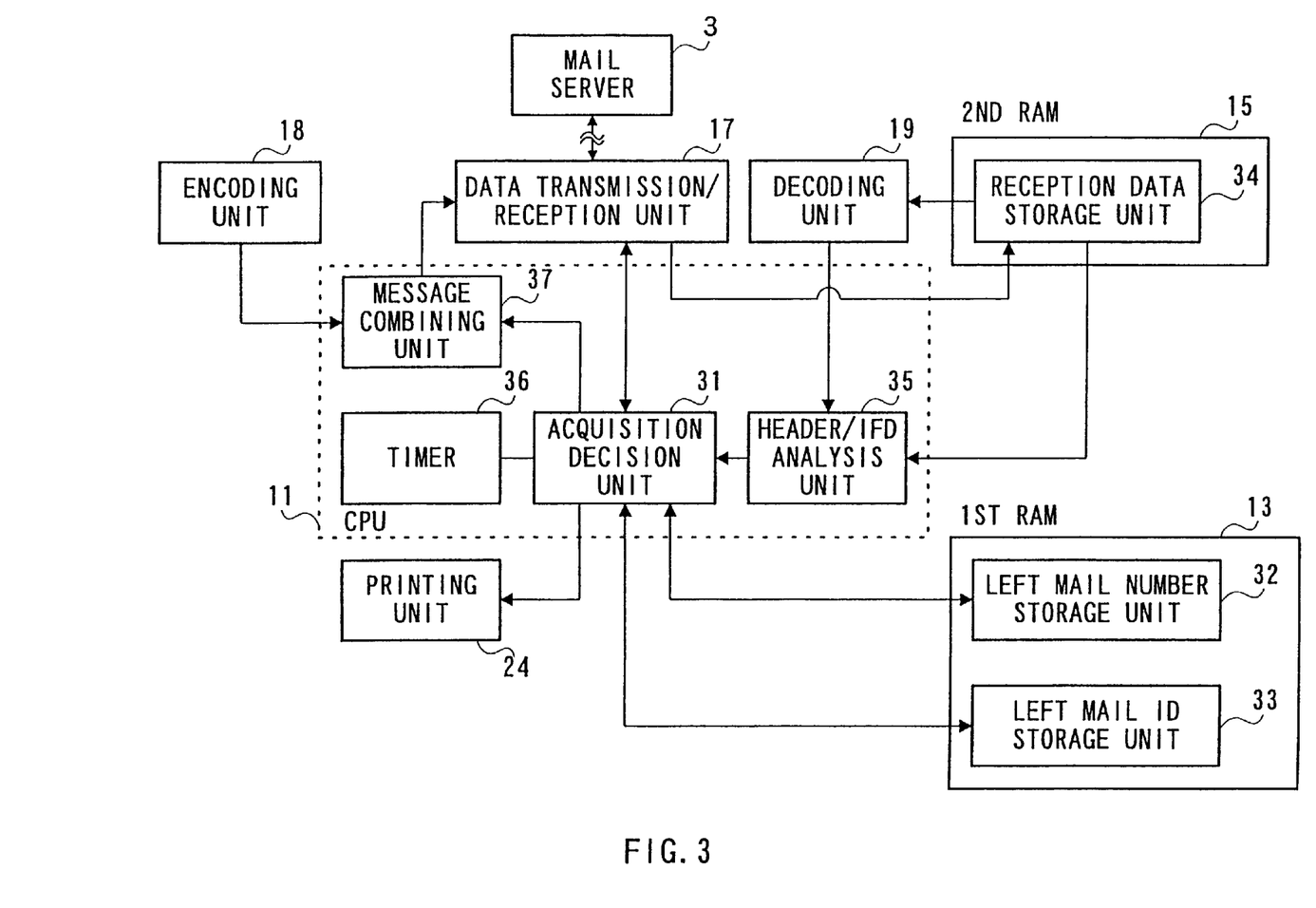
FIG. 3 illustrates a functional unit diagram of the E-mail type facsimile apparatus according to the above embodiment.

Then, the function of the E-mail type facsimile apparatus according to the present embodiment configured as shown above is explained below. FIG. 3 illustrates a functional unit diagram of the E-mail type facsimile apparatus according to the present embodiment.

Decision unit 31 decides whether mail is acceptable from mail server 3 or not and whether it is necessary to delete mail from mail server 3 or not. When the mail is acceptable, decision unit 31 acquires the mail and deletes it from mail server 3. When the mail is not acceptable, decision unit 31 does not acquire it, but leaves it in mail server 3. Decision unit 31 stores the mail left in server 3 (hereafter referred to as "left mail") in left mail number storage unit 32 of 1st RAM 13. It also stores the message ID of the latest left mail in ID storage unit 33 of 1st RAM 13 as the left mail ID. Here, a message ID is the identification data of mail and is generally a unique character string added to the header of a mail message. Therefore, different pieces of mail never have the same message ID. A message ID mainly consists of a domain name, date and time, etc.

Decision unit 31 makes data transmission/reception unit 17 receive data from mail server 3. The received data are stored in received data storage unit 34 of 2nd RAM 15.

Header/IFD analysis unit 35 acquires and analyzes necessary information from the received data. To be specific, header/IFD analysis unit 35 acquires mail information such as the message ID, presence/absence of attached files or type of the mail from the header section (hereafter referred to as "mail header") of the mail shown in FIG. 4. The mail header contains a message ID (Message-ID), sender address, date data, destination data and subject.

Figure 5:
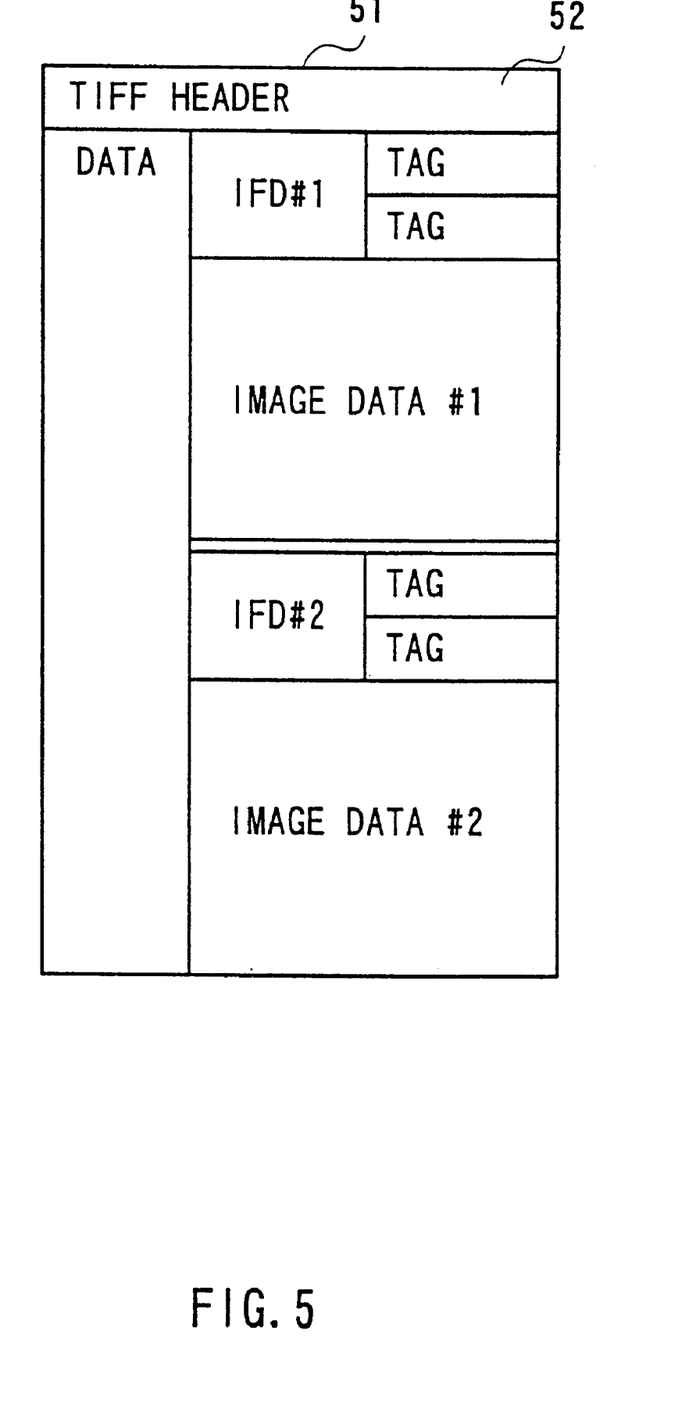
FIG. 5 illustrates a schematic drawing showing a TIFF file format according to the embodiment above.

Furthermore, header/IFD analysis unit 35 acquires attached file information from header 52 (hereafter referred to as "TIFF header") of TIFF file 51 attached to the mail shown in FIG. 5 and IFD (Image file directory) #1 and #2 which indicate the attributes of image data #1 and #2 contained in TIFF file 51. Here, TIFF header 52 contains "II~" or "MM~" which is data peculiar to TIFF files and is one of the indices to determine whether it is TIFF data or not.

The IFD also consists of two or more tags and each tag stores image data attributes. To be specific, attributes include image type (image file format), resolution, color number and size of the image, etc.

Since TIFF files are text-coded, they are decoded by decoding unit 19 and then analyzed by header/IFD analysis unit 35.

Header/IFD analysis unit 35 decides whether said mail is acceptable or not based on the above mail analysis results and hands over those results to decision unit 31. Details of the decision will be explained later with reference to FIG. 6 and FIG. 7. Decision unit 31 decides whether to receive the mail or not based on the decision of header/IFD analysis unit 3.

Timer 36 is used to measure the interval at which decision unit 31 accesses mail server 3.

Message combining unit 37 combines text-data such as a mail header to the text-coded image file which is output from encoding unit 18, to convert it to mail format data. Furthermore, message combining unit 37 synthesizes error mail.

Figure 6:
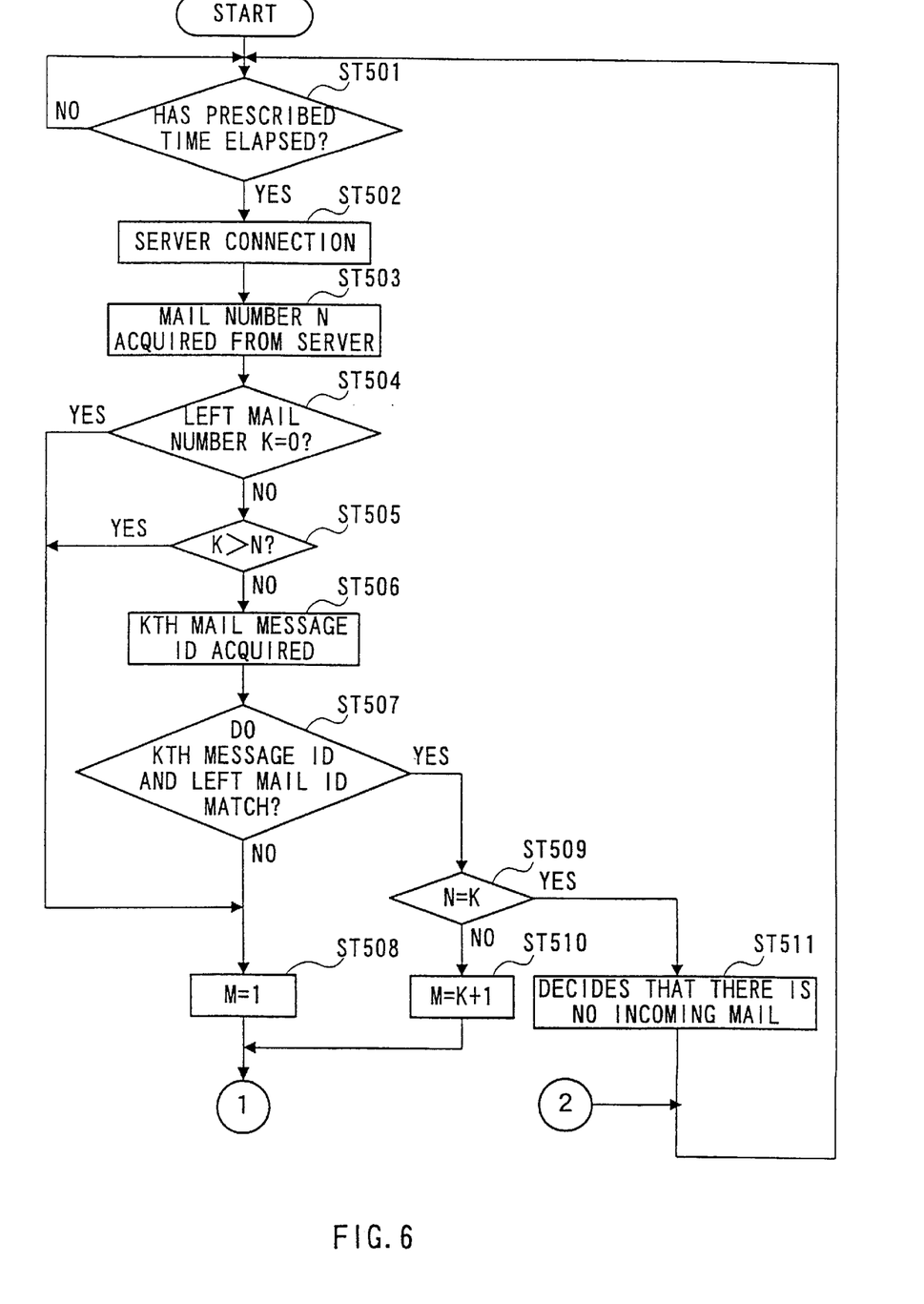
FIG. 6 illustrates a flow chart showing the procedure for receiving E-mail from a mail server in the E-mail type facsimile apparatus according to the embodiment above.
Figure 7:
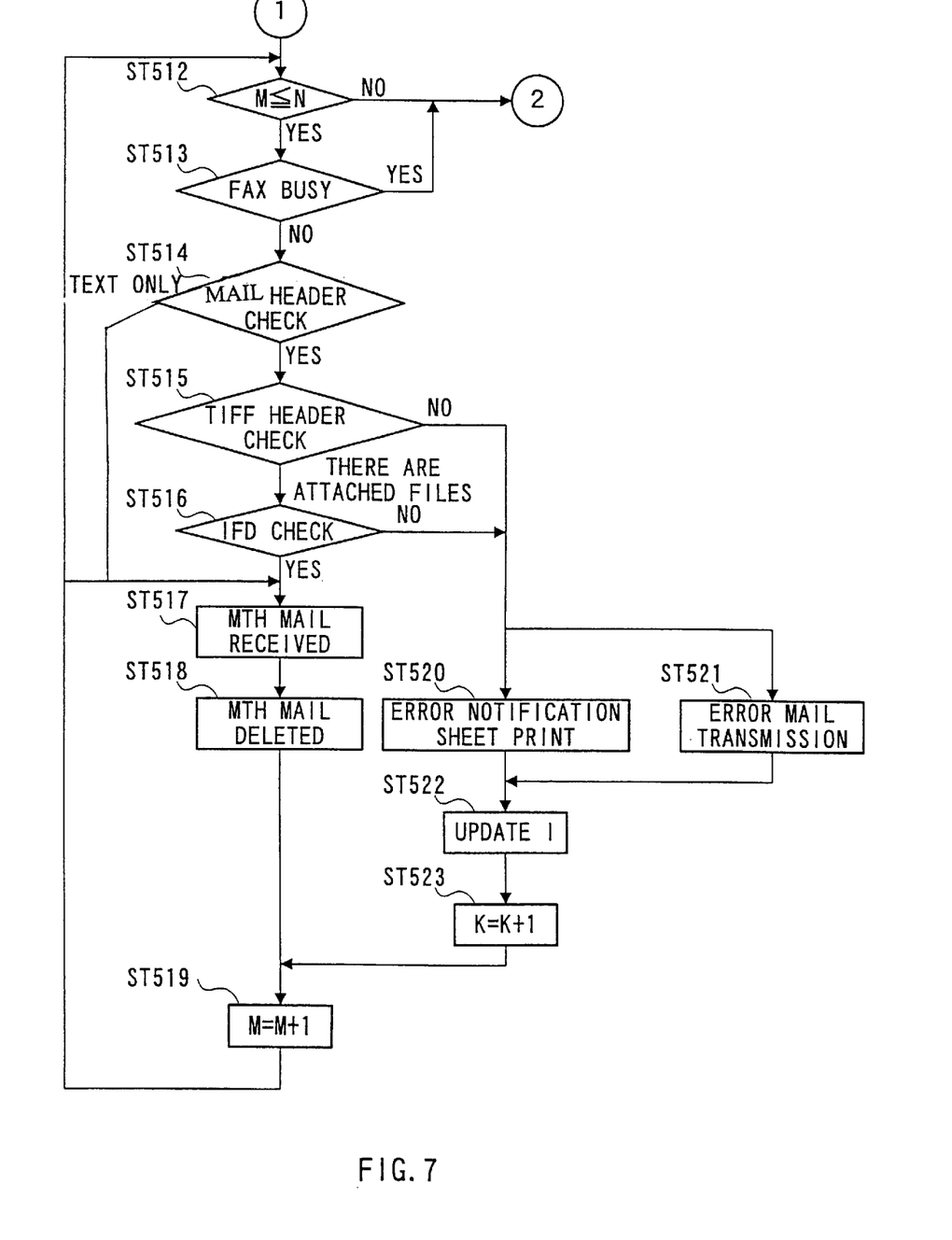
FIG. 7 illustrates a flow chart showing the procedure for receiving E-mail from a mail server in the E-mail type facsimile apparatus according to the embodiment above.

The procedure for receiving E-mail from the mail server in the E-mail type facsimile apparatus according to the present embodiment is now explained below. FIG. 6 and FIG. 7 are the flow charts showing the procedure for receiving E-mail from the mail server in the E-mail type facsimile apparatus according to the present embodiment.

In FIG. 6 and FIG. 7, K indicates the left mail number, I indicates left mail ID, and N indicates the total mail number stored in mail server 3. The initial value of K is 0 and the initial value of I is empty.

In step (hereafter referred to as "ST") 501 and ST502, decision unit 31 is on standby and is connected to mail server 3 at a prescribed interval.

In ST503, decision unit 31 is connected to mail server 3 and acquires total mail number N from mail server 3.

In ST504, decision unit 31 decides whether left mail number K is 0 or not. This left mail number K is stored in left mail number storage unit 32 when it was connected to mail server 3 at the last time. It advances to ST505 when K is not 0 and to ST508 when K is 0.

InST505, decision unit 31 decides whether left mail number K is greater than total mail number N (K>N) or not. When K>N, it is assumed that there is inconsistency between the number of pieces of mail left at the last time in mail server 3 and the number of pieces of mail actually stored in mail server 3 because some pieces of mail were taken out from another terminal, etc. In this case, since decision unit 31 cannot check the left mail normally, it decides that all N pieces of mail are new incoming mail and advances to ST508 to receive all pieces of mail. On the other hand, When K>N is not the case, it advances to ST506.

In ST506, decision unit 31 gains the message ID of the Kth mail stored in mail server 3. The message ID of the Kth mail is obtained by decision unit 31 requesting mail server 3 to transfer the 1st line of the Kth mail.

In ST507, decision unit 31 decides whether the message ID of the Kth mail acquired by ST506 matches the left mail ID stored in left mail ID storage unit 33.

When both IDs do not match in ST507, decision unit 31 decides that all N pieces of mail are new incoming mail and advances to ST508. In ST508, parameter M is set to 1. Parameter M indicates the number of the mail subject to mail analysis and reception processing after ST512.

When both IDs match, decision unit 31 advances to ST509. In ST509, it decides whether or not N=K. In the case where N is not K, the processing goes to ST510.In this case, it is already decided in decision section 31 by ST507 and ST508 that the mails up to Kth were tried to received at the last time but are still stored in mail saver 3 because they could not be outputted, and the mails from K+1th have newly arrived since the last time.

On the other hand, when N is K in ST509, decision unit 31 decides that there is no incoming mail in ST511 and returns to the standby state in ST501.

In ST512, parameter M and total mail number N are compared. When M is equal or less than N, decision unit 31 advances to ST513. When M is greater than N, decision unit 31 decides that all pieces of mail have already been received and returns to the standby state in ST501.

In ST513, it decides whether FAX busy or not. "FAX busy" means that it is not possible to receive mail because, for example, printing unit 24 is busy or performing other processing or received data storage unit 34 of 2nd RAM 15 is full. In this case decision unit 31 returns to the standby state in ST501.

In ST514 to ST516, header/IFD analysis unit 35 decides whether the Mth mail is acceptable or not as shown below.

Here, the case where mail is not acceptable refers to the case where the received mail cannot be printed as shown in the following examples:

The attached file is voice data, word-processed data or motion picture data.

The attached file is a TIFF file, but other than a minimum set.

Here, the "minimum set" means the minimum function of the E-mail type facsimile apparatus, and, to be specific, it means paper width of 1728 dots, compression method MH and data array of LSB, etc.

However, the above compression method is set to use a popular facsimile compression method. Of course, it is acceptable when the apparatus is provided with a compression method such as JBIG as an option.

Figure 4:
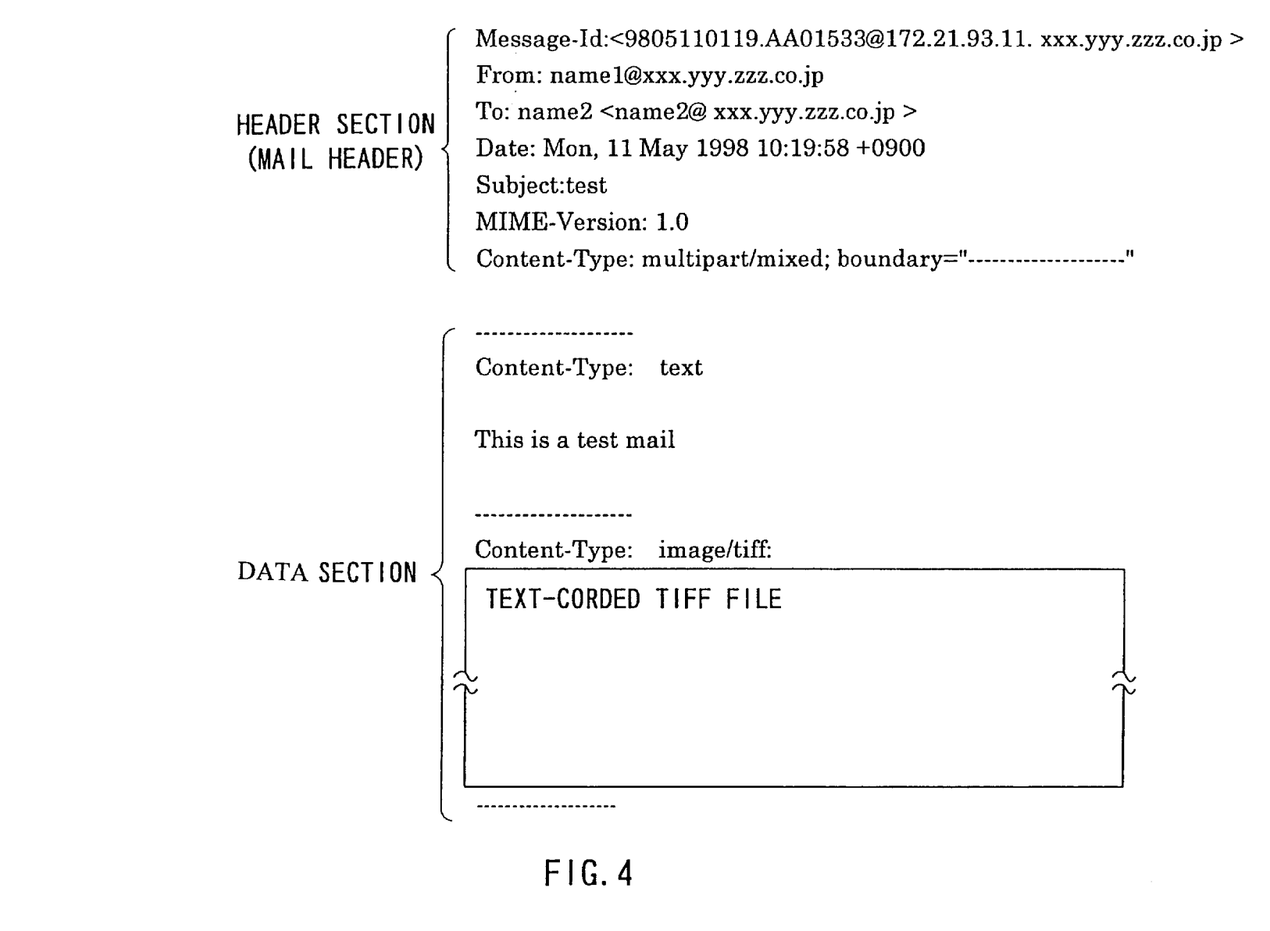
FIG. 4 illustrates an example of E-mail according to the embodiment above.

First in ST514, header/IFD analysis unit 35 checks the mail header of the mail shown in FIG. 4 and decides whether the attached file information indicates a TIFF file or not.

Specifically, when "Content-types:" included in the mail header is followed by "multipart/mixed," it is assumed that there are some attached files and TIFF files are attached and header/IFD analysis unit 35 advances to ST515. On the other hand, when "Content-type:" is followed by "text" or "Content-type:" is not included, it is assumed that the mail consists of text, it advances to ST517 skipping the subsequent analysis.

When "Content-type:" included in the mail header or data section is followed by "*****/tiff" (* means any character string), it may be assumed that TIFF files are attached to the mail.

In ST515, header/IFD analysis unit 35 checks the TIFF header. Specifically, header/IFD analysis unit 35 decides whether there are data beginning with "II~" or "MM~" in the header section of the attached file decoded by decoding unit 19 or not and decides whether the attached file is a TIFF file or not based on the presence/absence of "II~" or "MM~". When header/IFD analysis unit 35 decides that the attached file is a TIFF file, decision unit 31 advances the processing to ST516. On the other hand, when header/IFD analysis unit 35 decides that the attached file is not a TIFF file, decision unit 31 advances the processing to ST520 and ST521.

In ST516, header/IFD analysis unit 35 checks the IFD of the TIFF file. As described above, the IFD indicates the attributes of image data included in the TIFF file. Therefore, it decides whether it is possible or not to handle image data from the IFD. Header/IFD analysis unit 35 obtains the attributes of the image data included in the decoded TIFF file and decides whether it can handle the image data or not. When the image data can be handle, decision unit 31 decides that the mail is acceptable and advances the processing to ST517. On the other hand, When the image data cannot be handle, decision unit 31 decides that the mail is not acceptable and advances the processing to ST520 and ST521.

In ST517, decision unit 31 receives the Mth mail from mail server 3. After the reception is completed, in ST518, decision unit 31 deletes the Mth mail from mail server 3. This reception and deletion are carried out according to POP. Then, decision unit 31 advances to ST519.

On the other hand, error processes are performed in ST520 to ST523. In ST520, decision unit 31 makes printing unit 24 print an error notification sheet which indicates that decision 31 has received mail whose attached file format cannot be handled. It is also possible for message combining unit 37 to combine error mail of similar contents of the error notification sheet and transmit it to administration terminal 6 shown in FIG. 1. When error mail is received by administration terminal 6, the administrator receives the left mail from mail server 3 in place of said E-mail type facsimile apparatus.

In ST522, the left mail ID stored in left mail ID storage unit 33 of 1st RAM 13 is updated by the message ID of the Mth mail. In ST523, left mail number K which was stored in left mail number storage unit 32 is incremented by 1. Then, the processing advances to ST519.

In ST519, parameter M is incremented by 1 and the processing returns to ST512. Then, the next mail is analyzed and received. This causes the processing between ST512 and ST519 to be repeated until all pieces of mail stored in mail server 3 are collected.

Figure 8:
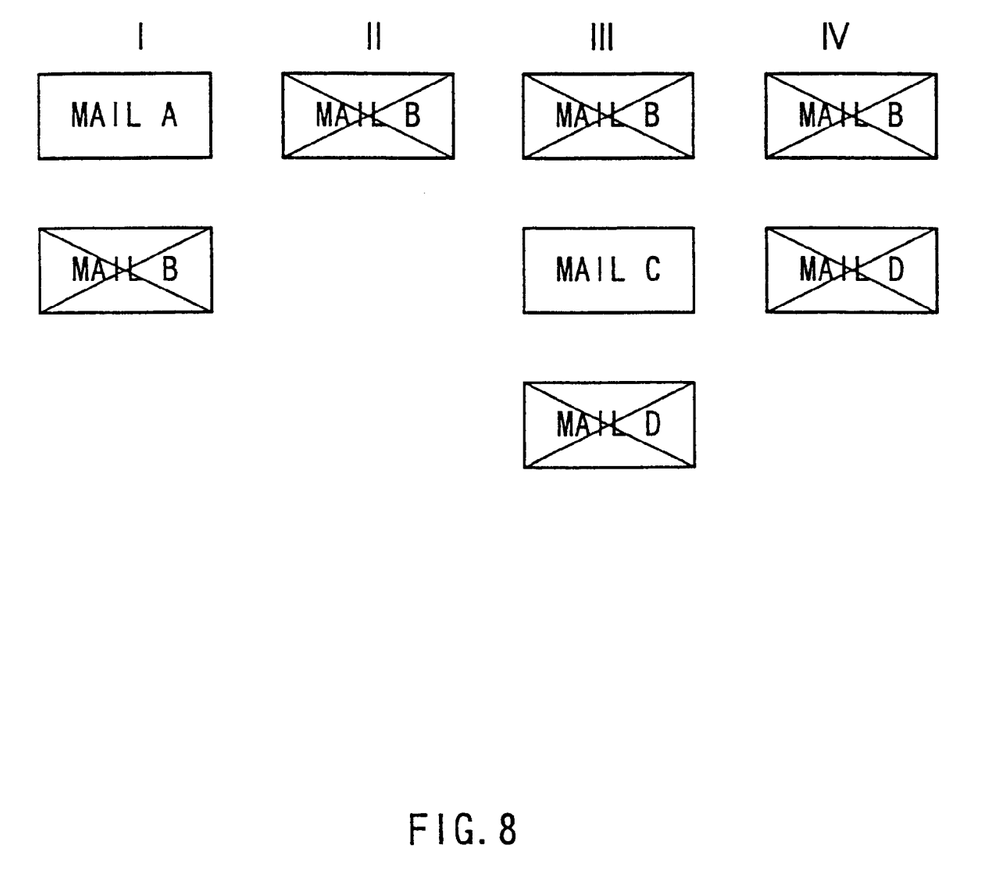
FIG. 8 illustrates a schematic drawing showing the in/out situation of mail in the mail server according to the embodiment above.

FIG. 8 is a schematic drawing showing the mail in/out status in mail server 3 when the operation above is actually performed.

Status I indicates that mail server 3 received two pieces of mail, mail A that can be output and mail B that cannot be output in the initial state when the left mail number (K)=0 and left mail ID (I) is empty.

Suppose that an inquiry is made of mail server 3 for the first time in this state. Mail server 3 returns "2" as total mail number N. Since this is the first inquiry (K=0), all pieces of mail in mail server 3 are new incoming mail and the number of new pieces of mail is decided to be "2" and mail A is received first. Mail A is deleted after it is output normally. Then the processing goes to reception of mail B is gone received. Since mail B is in a format that does not allow it to be output normally, it is not deleted from mail server. Its message ID is stored in I, K is incremented by 1 to be K=1, then the reception operation is completed. (status II).

Suppose that in status II, new mail C and D have arrived at mail server 3 (status III) and a second inquiry is made in this state. Mail C can be output and mail D that cannot be output. In this case, mail server 3 returns "3" as total mail number N. Since this value is greater than mail number K (=1) that is number of mail left and currently held in mail server 3, it is decided that there is new incoming mail. To identify from which part the new incoming mail begins, the message ID of the "K(=1)"th mail (mail B) is obtained and is compared with the message ID of the last mail left and currently held in mail server 3.

In this case, both IDs match and it is decided that mail up to this "K(=1)"th mail was already received at the last time and subsequent mail C and mail D are received as new incoming mail. Since mail C can be output, it is received and then deleted from mail server 3. Mail D is in a format that does not allow it to be output normally, it is not deleted from the mail server, but its message ID is stored in I, K is incremented by 1 to be K=2 and the reception operation is completed (status IV). Finally, mail B and mail D which could not be output normally remain in mail server 3 and the number of mail pieces left in mail server 3 that is "2" and the message ID of mail D that was left last are stored in the receiving side terminal.

As described above, according to the E-mail type facsimile apparatus in the present embodiment, decision unit 31 leaves unacceptable mail in mail server 3 and stores the number of pieces of left mail and the message ID of the latest mail in 1st RAM 13 as left mail number K and left mail ID (I), respectively. In the next access, the message ID of the Kth mail stored in mail server 3 is gained and compared with the left mail ID. When both IDs match, the "K+1"th and subsequent pieces of mail are received. Therefore, it is possible to distinguish left mail and new incoming mail, avoiding repeated reception of left mail.

Furthermore, header/IFD analysis unit 35 analyzes the mail header, TIFF header and IFD and decides whether or not to accept the mail based on the analysis result. When the mail is acceptable, the mail is received, then deleted. On the other hand, when the mail is unacceptable it leaves the mail as left mail in mail server 3. Thus, mail server 3 can be used as a secondary storage device.

When the mail is decided unacceptable, decision unit 31 can make printing unit 24 print an error notification sheet or make data transmission/reception section 17 send error mail to the sender or administrator, requesting the sender to retransmit appropriate mail or to receive the mail in place of the administrator.

It is also possible for FAX control unit 20 shown in FIG. 2 to send the error notification sheet to the sender through the nearest facsimile apparatus to inform it of the error.

As shown above, the present embodiment makes it possible to implement optimal E-mail transmission/reception in a facsimile apparatus with a small memory capacity.

As described above, according to the present invention, it is possible to leave E-mail in the mail server using it as a secondary storage device and distinguish the E-mail left and new incoming E-mail in subsequent accesses.

What is claimed is:

1. An internet facsimile apparatus for receiving image data through a computer network, the apparatus comprising:

a scanner adapted to scan an original to obtain image data;

a printing unit adapted to print at least one of a plurality of data;

an interface which is connected to a computer network;

a memory adapted to store the at least one of the plurality of data; and a processor which is controllably connected to said scanner, said printing unit, said interface and said memory;

wherein:

said processor is configured to access a mail server apparatus through said interface via the computer network;

said processor is configured to store, in said memory, a number K of left mail E-mail pieces left in the mail server apparatus at last access;

said processor is configured to store, in said memory, left mail ID identification data of a last piece of a plurality of E-mail pieces left in the mail server apparatus;

said processor is configured to obtain total number N of E-mail held in the mail server apparatus, and further obtain Kth E-mail identification data of a Kth E-mail held in the mail server apparatus at next access;

said processor is further configured to compare the Kth E-mail identification data and the left mail ID identification data, and the total number N and the number K separately;

said processor is configured to receive an E-mail which is newer than the Kth E-mail when the Kth E-mail identification data and the left mail ID identification data agree;

said processor is configured to disconnect an access at the next access upon a determination of no newly received E-mail when the Kth E-mail identification data and the left mail ID identification data agree and when the total number N and the number K agree; and said processor is configured to receive an E-mail having a number greater than or equal to K+1 when the Kth E-mail identification data and the left mail ID identification data do not agree or when the total number N and the number K do not agree.

2. The apparatus according to claim 1, wherein said processor is further configured to analyze the E-mail and decide whether or not the E-mail is acceptable; and wherein the processor, is further configured to store in said memory, as left mail ID identification data, identification data of the E-mail which is decided as unacceptable.

3. The apparatus according to claim 1, wherein said processor is further configured to leave the E-mail in the mail server when said processor decides that the E-mail is unacceptable as a result of the analysis.

4. The apparatus according to claim 1, wherein said processor is further configured to analyze at least of an E-mail header section, a TIFF file header section and a TIFF file image file attribute of the E-mail.

5. The apparatus according to claim 1, wherein said processor is further configured to output an error message when said processor decides that the E-mail is unacceptable.

6. The apparatus according to claim 5, wherein said processor is further configured to output the error message by facsimile.

7. The apparatus according to claim 1, wherein said processor is configured to produce an error when said processor decides that the E-mail is unacceptable.

8. A method for receiving an E-mail, in an Internet facsimile apparatus for receiving image data by E-mail through a computer network, by accessing a mail server apparatus connected to the computer network, the method comprising:

storing a number K of E-mail pieces left in the mail server apparatus at last access;

storing left mail ID identification data of a last piece of a plurality of E-mail pieces left in the mail server apparatus;

obtaining total number N of E-mail held in the mail server apparatus, and further obtain Kth E-mail identification data of a Kth E-mail held in the mail server apparatus;

comparing the Kth E-mail identification data and the left mail ID identification data, and the total number N and the number K separately;

receiving an E-mail which is newer than the Kth E-mail when the Kth E-mail identification data and the left mail ID identification data agree;

disconnecting an access at the next access upon a determination of no newly received E-mail when the Kth E-mail identification data and the left mail ID identification data agree and when the total number N and the number K agree; and receiving an E-mail having a number greater than or equal to K+1 when the Kth E-mail identification data and the left mail ID identification data do not agree or when the total number N and the number K do not agree.

9. An internet facsimile apparatus for transmitting and receiving image data by E-mail through a computer network, the apparatus comprising:

a scanner adapted to scan an original to obtain image data;

a printing unit adapted to print at least one of a plurality of data;

an interface which is connected to a computer network;

a memory adapted to store the at least one of the plurality of data; and a processor which is controllably connected to said scanner, said printing unit, said interface and said memory;

wherein:

said processor is configured to access a mail server apparatus through said interface via the computer network;

said processor is configured to store, in said memory, a number K of left mail E-mail pieces left in the mail server apparatus at last access said processor is configured to store, in said memory, left mail ID identification data of a last piece of a plurality of E-mail pieces left in the mail server apparatus;

said processor is configured to obtain total number N of E-mail held in the mail server apparatus and further obtain Kth E-mail identification data of a Kth E-mail held in the mail server apparatus, at next access, from the mail server apparatus;

said processor is configured to compare the Kth E-mail identification data and the left mail ID identification data, and the total number N and the number K separately;

said processor is configured to disconnect an access at the next access upon a determination of no newly received E-mail when the Kth E-mail identification data and the left mail ID identification data agree and when the total number N and the number K agree; and said processor is configured to receive an E-mail having a number greater than or equal to K+1 when the Kth E-mail identification data and the left mail ID identification data do not agree or when the total number N and the number K do not agree.

10. The apparatus according to claim 1, wherein said processor is further configured to receive all E-mail held in the mail server apparatus when the Kth E-mail identification data and the left mail ID identification data do not agree.

11. The apparatus according to claim 1, wherein said processor is further configured to delete at least one of the plurality of E-mail pieces held in the mail server apparatus, so that at least one E-mail piece remains in the mail server apparatus.

12. The apparatus according to claim 2, wherein the printing unit is not configured to print the E-mail which is decided as unacceptable.

* * * * *

UNITED STATES PATENT AND TRADEMARK OFFICE
CERTIFICATE OF CORRECTION

PATENT NO. : 6,128,101          Page 1 of 1
DATED : October 3, 2000
INVENTOR(S) : K. SAITO It is certified that error appears in the above-identified patent and that said Letters Patent is hereby corrected as shown below:

At column 8, line 29 (claim 4, line 2) of the printed patent, "at least of an E-mail" should be ---at least an E-mail---.

On the cover of the printed patent, at Item [56], References Cited, U.S. Patent Documents, line 4, "5,647,022" should be ---5,647,002---.

Signed and Sealed this

Fifth Day of June, 2001

*Attest:*

*Attesting Officer*

NICHOLAS P. GODICI

*Acting Director of the United States Patent and Trademark Office*